United States Patent Office 3,842,066
Patented Oct. 15, 1974

3,842,066
(ALA³, ALA¹⁴)-SRIF AND INTERMEDIATES
Wayne A. McKinley, Wallingford, and Dimitrios Sarantakis, Audubon, Pa., assignors to American Home Products Corporation, New York, N.Y.
No Drawing. Filed June 25, 1973, Ser. No. 373,213
Int. Cl. A61k 27/00; C07c 103/52
U.S. Cl. 260—112.5     4 Claims

ABSTRACT OF THE DISCLOSURE

The tetradecapeptide Ala-Gly-Ala-Lys-Asn-Phe-Phe-Trp-Lys-Thr-Phe-Thr-Ser-Ala-OH is described as well as novel intermediates used in the synthesis of such tetradecapeptide. This tetradecapeptide inhibits the release of growth hormone and prolactin.

---

This invention relates to the tetradecapeptide Ala-Gly-Ala-Lys-Asn-Phe-Phe-Trp-Lys-Thr-Phe - Thr - Ser - Ala-OH and intermediates obtained in the synthesis of this compound.

Somatostatin (also known as somatotrapin release inhibiting factor) is the tetradecapeptide

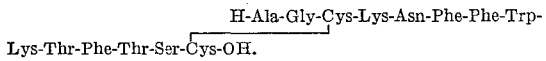
Lys-Thr-Phe-Thr-Ser-Cys-OH.

This tetradecapeptide has only recently been identified by isolation from extracts of ovine hypothalamic tissues and found to inhibit the secretion of the hormone somatotropin which is commonly referred to as the growth hormone (GH); see Brazeau et al., Science, 179, pp. 77–79 (January 1973). The linear form of this tetradecapeptide represented by H-Ala-Gly-Cys-Lys-Asn-Phe-Phe-Trp-Lys-Thr-Phe-Thr-Ser-Cys-OH, has also been reported by Brazeau et al., supra, to have been synthesized by solid phase methodology and found to have the same biological activity as the somatostatin obtained from a natural source.

The novel tetradecapeptide of the present invention is an analog of the linear counterpart of somatostatin in which the two cysteinyl amino acid residues in the three and fourteen position have been replaced by the alanyl amino acid residues.

The novel tetradecapeptide of the present invention is defined by the formula Ala-Gly-Ala-Lys-Asn-Phe-Phe-Trp-Lys-Thr-Phe-Thr-Ser-Ala-OH (I) and non toxic acid addition salts thereof. As a convenient shorthand form this compound can be described as Ala³,¹⁴-SRIF.

The nomenclature used to depict the peptides follow that shown is by Schroder & Lube, "The Peptides," 1, pp. viii–xxix (Academic Press, 1965) and in accordance with such nomenclature, it is the L form of the amino acid that is intended, unless otherwise expressly indicated.

Illustrative of pharmaceutally acceptable acid addition salts are hydrochloride, hydrobromide, sulfide, phosphate, maleate, acetate, citrate, benzoate, succinate, malate, ascorbate, and the like.

Also contemplated within the scope of the present invention are intermediates of the formula R-Ala-Gly-Ala-Lys(R¹)-Asn-Phe-Phe-Trp-Lys(R¹)-
    Thr(R²)-Phen-Thr(R²)-Ser(R³)-Ala-X   (II)

wherein R is either hydrogen or an α-amino protecting group. The α-amino protecting groups contemplated by R are those known to be useful in the art in the step-wise synthesis of polypeptides. Among the classes of α-amino protecting groups covered by R are (1) acyl type protecting groups illustrated by the following: formyl, trifluoroacetyl, phthalyl, toluenesulfonyl (tosyl), benzenesulfonyl, nitrophenylsulfenyl, tritylsulfenyl, o-nitrophenoxyacetyl, chloroacetyl, acetyl, γ-chlorobutyryl, etc.; (2) aromatic urethan type protecting groups illustrated by benzyloxycarbonyl and substituted benzyloxycarbonyl such as p-chlorobenzyloxycarbonyl, p-nitrobenzyloxycarbonyl, p-bromobenzyloxycarbonyl, p-methoxybenzyloxycarbonyl; (3) aliphatic urethane protecting groups illustrated by tert-butyloxycarbonyl, diisopropylmethoxycarbonyl, isopropyloxycarbonyl, ethoxycarbonyl, allyloxycarbonyl; (4) cycloalkyl urethan type protecting groups illustrated by cyclopentyloxycarbonyl, adamantyloxycarbonyl, cyclohexyloxycarbonyl; (5) thio urethan type protecting groups such as phenylthiocarbonyl; (6) alkyl type protecting groups as illustrated by triphenylmethyl (trityl), benzyl; (7) trialkylsilane groups such as trimethylsilane. The preferred α-amino protecting group defined by R is tert-butyloxycarbonyl.

R¹ is a protecting group for the side chain amino substitutent of lysine or R¹ is hydrogen which means there is no protecting group on the side chain amino substituent. Illustrative suitable side chain amino protecting groups are benzyl, chlorobenzyloxycarbonyl, benzyloxycarbonyl, tosyl, t-amyloxycarbonyl, t-butyloxycarbonyl, etc. The selection of such a side chain amino protecting group is not critical except that it must be one which is not removed during deprotection of the α-amino groups during the synthesis. Hence, the α-amino protecting and side chain amino protecting group cannot be the same. R² and R³ are protecting groups for the alcoholic hydroxyl group of threonine and serine and is selected from the class consisting of acetyl, tosyl, benzoyl, tert-butyl, trityl, benzyl and benzyloxycarbonyl. The preferred protecting group is benzyl; or R² and R³ is hydrogen which means there is no protecting group on the alcoholic hydroxyl function; X is selected from the class consisting of OH, OCH₃ and an anchoring bond used in solid phase synthesis linked to a solid resin support represented by the formula

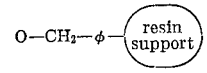

The symbol φ means "phenyl." In formula II, at least one of R, R¹, R² and R³ is a protecting group.

In selecting a particular side chain protecting group to be used in the synthesis of the peptides of formula (I), the following rules should be followed: (a) the protecting group must be stable to the reagent and under the reaction conditions selected for removing the α-amino protecting group at each step of the synthesis, (b) the protecting group must retain its protecting properties, (i.e. not to be split off under coupling conditions, and (c) the side chain protecting group must be removable upon the completion of the synthesis containing the desired amino acid sequence under reaction conditions that will not alter the peptide chain.

The tetradecapeptide peptide of formula (I) is prepared using solid phase synthesis. The synthesis is commenced from the C-terminal end of the peptide using an α-amino protected resin. Such a starting material can be prepared by attaching an α-amino protected alanine to a chloromethylated resin or a hydroxymethyl resin. The preparation of the hydroxymethyl resin is described by Bodanszky et al., Chem. Ind. (London), 38, 1597–98 (1966). A chloromethylated resin is commercially available from Bio Rad Laboratories, Richmond, Calif. The α-amino protected alanine is coupled to the chloromethylated or hydroxymethyl resin with the aid of a carboxyl group activating compound such as dicyclohexyl carbodiimide. Following the coupling of the α-amino protected alanine to the resin support, the α-amino protecting group is removed such as by using trifluoroacetic acid in methylene chloride, trifluoroacetic acid alone or HCl in dioxane. The deprotection is carried out at a temperature between about 0° C. and room temperature. Other standard cleaving reagents and conditions for removal of specific α-amino protecting groups may be used as described in Schroder & Lubke, supra, *1*, pp. 72–75. After removal of the α-amino protecting group the remaining α-amino protected amino acids are coupled step-wise in the desired order to obtain a compound of formula (I). However, as an alternate to adding each amino acid separately to the reaction, some of them may be coupled prior to addition to the solid phase reactor. Each protected amino acid or amino acid sequence, is introduced into the solid phase reactor in about a four-fold excess and the coupling is carried out in a medium of dimethylformamide: methylene chloride (1:1) or in dimethylformamide or methylene chloride alone. In cases where incomplete coupling occurred the coupling procedure is repeated before removal of the α-amino protecting group, prior to the coupling of the next amino acid to the solid phase reactor. The success of the coupling reaction at each stage of the synthesis is monitored by the ninhydrin reaction as described by E. Kaiser et al., Analyt. Biochem., *34*, 595 (1970).

After the desired amino acid sequence of formula II has been synthesized, the peptide is removed from the resin support by treatment with a reagent such as hydrogen fluoride which not only cleaves the peptide from the resin but also cleaves all remaining side chain protecting groups $R^1$, $R^2$ and $R^3$ and the α-amino protecting group R on alanine to obtain directly a compound of formula I. As an alternate route, the tetradecapeptide linked to the resin support may be separated from the resin by methanolysis after which the recovered C-terminal methyl ester is converted to the acid by hydrolysis. Any side chain protecting group may then be cleaved as previously described or by other procedures such as catalytic reduction (e.g. Pd on $BaSO_4$) using conditions which will keep the Trp moiety intact. When using hydrogen fluoride for cleaving, anisole is included in the reaction vessel to prevent the oxidation of labile amino acid (e.g. tryptophan).

The solid phase synthesis procedure discussed supra is well known in the art and has been essentially described by M. Monahan et al., C. R. Acad. Sci., Paris, *273*, 508 (1971).

The following examples are illustrative of the preparation of the compounds of formulas I and II.

EXAMPLE 1 t-Butyloxycarbonyl - L - alanylglycyl-L-alanyl-N-(2-chlorocarbobenzoxy) - L - lysyl - L - asparaginyl-L-phenylalanyl-L-phenylalanyl - L - tryptopjhyl-N-(2-chlorocarbobenzoxy) - L - lysyl-O-benzyl-L-threonyl-L-phenylalanyl-O-benzyl - L - threonyl - O - benzyl-L-seryl-L-alanyl methylated polystyrene resin Chloromethylated polystyrene resin (10 g.) is refluxed in a 500 ml. round bottom flask with t-butyloxycarbonyl-L-alanine (2.84 g., 15 mmoles), and triethylamine (2.08 ml., 15 mmoles) in ethanol (75 ml.), for 18 hours. The resin is filtered and washed on the filter with methanol, methylene chloride, ethanol, dimethylformamide, 12.5% triethylamine in methylene chloride, and methylene chloride (three times). The resin is found to be substituted to the extent of 0.35 mmoles of t-Boc-L-alanine per gram of resin.

The resin is then transferred to a Merrifield vessel of 100 ml. capacity and deprotected as follows: the resin is treated with three portions of trifluoroacetic acid 80% in methylene chloride for a total of 20 minutes, then washed with: (a) dimethylformamide (two times); (b) methylene chloride (three times); (c) 12.5% triethylamine in methylene chloride (two times for 10 minutes each); (d) dimethylformamide; (e) methanol; (f) methylene chloride (three times), allowing a contact time of at least three minutes each, except where indicated otherwise.

The following amino acid residues are introduced consecutively: t-Boc-O-benzyl-L-serine (6.5 mmoles, 6.8 mmoles of DCC), t-Boc-O-benzyl-L-threonine (6.5 mmoles, 7.0 mmoles of DCC), t-Boc-L-phenylalanine (6.5 mmoles, 6.7 mmoles of DCC), t-Boc-O-benzyl-L-threonine (6.5 mmoles, 6.8 mmoles of DCC), t-Boc-N-(2-chlorocarbobenzoxy)-L-lysine (6.5 mmoles, 6.7 mmoles of DCC) (this coupling repeated using one-half the quantity of reactants), and t-Boc-L-tryptophan (6.5 mmoles, 6.7 mmoles of DCC). All the couplings are carried out in a mixture of methylene chloride and dimethylformamide (not less than 2:1) with dicyclohexylcarbodiimide (DCC added in two portions over one hour) at ambient temperature for 18 hours. The deprotection and washings are the same as described above for the first amino acid, with the exception of the neutralization after deprotection of the serine. In this case the neutralization is carried out at 5° C. for one treatment of five minutes; it is then washed at 5° C. and reacted immediately.

From this point on the deblocking is carried out in a mixture of 80% trifluoroacetic acid, 5% 1,2-ethane dithiol, and 15% methylene chloride. The following amino acids are coupled to the resin next: t-Boc-L-phenylalanine (6.5 mmoles, 6.7 mmoles of DCC), t-Boc-L-phenylalanine (6.5 mmoles, 6.7 mmoles of DCC), t-Boc-L-asparagine-p-nitrophenyl ester (15 mmoles, 2 drops of glacial acetic acid), t-Boc-N-(2-chlorocarbobenzoxy)-L-lysine (6.5 mmoles, 7.0 mmoles of DCC), t-Boc-L-alanine (6.5 mmoles, 7.0 mmoles of DCC) (repeated this coupling using one-half the quantity of reactants), and t-Boc-L-ananylglycine (8.13 mmoles, 9.0 mmoles of DCC). The couplings are carried out as before except for asparagine. This amino acid is coupled through the p-nitrophenyl ester in the presence of a catalytic amount of glacial acetic acid for four days at ambient temperature.

The washed resin is washed two times with boiling methanol and dried *in vacuo* overnight.

EXAMPLE 2

L-alanylglycyl - L - alanyl-L-lysyl-L-asparginyl-L-phenylalanyl-L-phenylanyl-L-tryptophyl - L- lysyl-L-threonyl-L-phenylalanyl-L-threonyl-L-seryl-L-alanine The above described preparation obtained in Example 1 is treated *in vacuo* with liquid hydrogen fluoride (65 ml.) and anisole (15 ml.) at 0° C. for 30 minutes and ambient temperature for 15 min. The hydrogen fluoride and anisole are then removed as quickly as possible under reduced pressure and the residue taken up in 1% acetic acid, filtered, and the filtrate extracted with ether. The acetic acid phase is then lyophylyzed to leave 1.63 gm. of the above titled product.

EXAMPLE 3

Purification and characterization of L-alanylglycyl-L-alanyl-L-lysyl - L - asparginyl-L-phenylalanyl-L-phenylalanyl-L-tryptophyl-L-lysyl - L - threonyl - L - phenylalanyl-L-threonyl-L-seryl-L-alanine The above titled crude product is purified and characterized as follows: 1.63 gm. of this product in 5 ml. of .2N acetic acid is applied to a column (2.9 cm. in diameter and 100 cm. in height) with a bed of Bio-Gel P–2 previously equilibrated with .2N acetic acid and eluted with that solvent. Fractions of 3 ml. each are taken. Analysis of the column effluent is carried out by use of the Folinlowry color reaction on every third fraction. Six main peptide containing fractions (A) 40–60 (98 mg.), (B) 61–85 (164 mg.), (BB) 86–100 (113 mg.), (C) 105–120 (245 mg.), (D) 121–135 (303 mg.), (E) 136–170 (248 mg.) are obtained. Fractions A, B and BB (375 mg.) are shown by thin layer chromatography system BWAP (4:2:1:1) (n-butanol:water:acetic acid:pyridine) to contain the same major material. They are combined and applied in 1 ml. of ethanol: .2N acetic acid (4:1) to a column (1.9 cm. in diameter by 100 cm. in height) containing Sephadex LH–20 previously equilibrated with ethanol:.2N acetic acid (4:1). The column is eluted with that solvent and fractions of 1 ml. each are taken. The column effluent is monitored as described before. Three major fractions are obtained: (A) 50–60 (87 mg.), (B) 61–70 (107 mg.), (C) 71–85 (31 mg.). Fraction A is the purest fraction as indicated by thin layer chromatography system BWAP (4:2:1:1), and amino acid analysis. Fraction A is taken up in .5 ml. of .2N acetic acid and applied to a column (1.9 cm. in diameter by 100 cm. in height) containing Sephadex LH-20 equilibrated with .2N acetic acid. The column is eluted with that solvent and fractions of 1.5 ml. each are taken. The column effluent is again monitored as before. Four main fractions are obtained: (A) 30–40 (13 mg.), (B) 41–52 (23 mg.), (C) 53–60 (34 mg.), (D) 61–75 (7 mg.). Fraction C is homogenous by thin layer chromatography system BWAP (4:2:1:1). Thin layer chromatograms are visualized with iodine and Ehrlich's reagent. $[\alpha]_D^{26}$ —44.13 (c. 1.04, 1% AcOH).

After hydrolysis of the peptide in 6N HCl containing 4% thioglycolic acid for 20 hours at 110° C. in a closed system under nitrogen, the following values for $(L-Ala)^{3,14}$-SRIF are obtained: Ala (2.88), Gly (1.04), Lys (1.98), Asp (0.98), Phe (3.00), Trp (0.74), Thr (1.66), Ser (0.71).

The growth hormone and prolactin release inhibiting activity of the compound of Example 3 was determined by radioimmunoassay in a rat pituitary cell culture system as described by Vale et al., Endocrinology, *91* p. 562 (1972) and Grant et al., Biochemical and Biophysical Research Communications, *51*, pp. 100–106 (1973). The compound of Example 3 was tested as low as 5 μg/ml. and was found active in inhibiting prolactin release. The compound of Example 3 was tested at 1 and .025 μg./ml. and was active at both concentrations in inhibiting growth hormone release.

The compounds described herein may be administered to warm blooded mammals, including humans, either intravenously, subcutaneously, intramuscularly or orally to inhibit the release of growth hormone where the host being treated requires therapeutic treatment for excess secretion of somatotropin which is associated with conditions such as juvenile diabetes and acromegaly. The contemplated dose range for oral administration in tablet or capsule form to large mammals is about 0.015 mg. to about 7 mg./kg. of body weight per day while the dose range for intravenous injections in an aqueous solution is about 0.1 μg. to about 0.15 mg./kg. of body weight per day. When administered subcutaneously or intramuscularly a dose range of about 1.5 μg. to about 0.7 mg./kg. of body weight per day is contemplated. Obviously, the required dosage will vary with the particular condition being treated, the severity of the condition and the duration of treatment.

If the active ingredient is administered in tablet form the tablet may contain: a binder such as gum tragacanth, corn starch, gelatin, an excipient such as dicalcium phosphate; a disintegrating agent such as corn starch, alginic acid, etc.; a lubricant such as magnesium stearate; and a sweetening and/or flavoring agent such as sucrose, lactose, wintergreen, etc. Suitable liquid carriers for intravenous administration include isotonic saline, phosphate buffer solutions, etc.

What is claimed is:

1. A compound selected from those of the formula:

L - Ala - Gly - L - Ala - L - Lys - L - Asn - L - Phe - L - Phe-L-Trp-L-Lys-L-Thr-L-Phe-L-Thr-L-Ser-L-Ala-OH    (I)

and

R - L - Ala - Gly - L - Ala - L - Lys($R^1$) - L - Asn - L - Phe - L - Phe - L - Trp - L - Lys($R^1$) - L - Thr($R^2$) - L - Phe-L-Thr($R^2$)-L-Ser($R^3$)-L-Ala-X    (II)

and the non-toxic salts thereof, wherein:

R is selected from the class consisting of H and an α-amino protecting group;

$R^1$ is selected from the class consisting of hydrogen or a side chain amino protecting group;

$R^2$ and $R^3$ are protecting groups for the alcoholic group selected from the class consisting of acetyl, tosyl, benzoyl, *tert*-butyl, trityl, benzyl, benzyloxycarbonyl or hydrogen; with the proviso that at least one of R, $R^1$, $R^2$ and $R^3$ is other than hydrogen;

X is selected from the class consisting of hydroxy, methoxy and

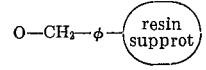

wherein the resin support is polystyrene.

2. A compound according to claim 1 which is selected from L-alanylglycyl - L - alanyl - L - lysyl - L - asparaginyl - L - phenylalanyl - L - phenylalanyl - L - tryptophyl-L-lysyl - L - threonyl - L - phenylalanyl - L - threonyl-L-seryl - L - alanine and its non-toxic acid addition salts.

3. A compound represented by formula II of claim 1, wherein X is

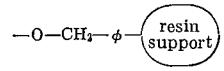

4. A compound according to claim 3 wherein R is *tert*-butyloxycarbonyl and each of $R^2$ and $R^3$ are benzyl and $R^1$ is 2-chlorobenzyloxycarbonyl.

References Cited

Brazeau et al.: Science, *179*, 77–9 (1973).
Burgus et al.: Chem. Abstr., *78*:144471n (1973).
Rivier et al.: Chem. Abstr., *79*:53765r (1973).

LEWIS GOTTS, Primary Examiner

R. J. SUYAT, Assistant Examiner

U.S. Cl. X.R.

424—177